United States Patent [19]

Rogers et al.

[11] Patent Number: 5,021,624

[45] Date of Patent: Jun. 4, 1991

[54] CUTTING TOOLS FOR CONVENTIONAL AND MIG ELECTRIC WELDERS

[76] Inventors: Gene Rogers, 611 Delwood; Alex H. de Martimprey, 103 Elm St., both of Westwood, Calif. 96137

[21] Appl. No.: 180,343

[22] Filed: Apr. 11, 1988

[51] Int. Cl.⁵ .............................................. B23K 9/00
[52] U.S. Cl. ..................................................... 219/70
[58] Field of Search .................. 219/70, 72, 74, 130.1, 219/136, 137.31, 137.42, 124.01, 124.02, 138; 266/48, 51

[56] References Cited

U.S. PATENT DOCUMENTS

| | | | |
|---|---|---|---|
| 894,195 | 7/1908 | Delcampe | 148/9 R |
| 999,099 | 7/1911 | Debus et al. | 219/70 |
| 2,437,652 | 3/1948 | Reddick | 219/138 |
| 2,475,594 | 7/1949 | Danhier | 219/70 |
| 2,527,490 | 10/1950 | Adams | 219/70 |
| 2,821,615 | 1/1958 | Fannon | 219/74 |
| 3,470,345 | 9/1969 | Vaillancourt | 219/70 |
| 3,563,812 | 2/1971 | Nakanishi et al. | 148/9 |
| 4,109,131 | 8/1978 | Schlüter | 219/74 |
| 4,361,746 | 11/1982 | Johnson et al. | 219/70 |
| 4,410,788 | 10/1983 | Summers et al. | 219/130.1 |
| 4,538,048 | 8/1985 | Heed | 219/136 |
| 4,812,610 | 3/1989 | Moore | 219/70 |

FOREIGN PATENT DOCUMENTS

136547 10/1979 Japan ................................. 219/70

Primary Examiner—Geoffrey S. Evans
Attorney, Agent, or Firm—Blakely, Sokoloff, Taylor & Zafman

[57] ABSTRACT

Cutting tools for MIG (metal-inert gas) welders and conventional electric arc welders which provide clean and fast cutting action of ferrous and other oxidizable materials using only a directed stream of oxygen after cutting is initiated. For MIG welders, the cutting tool may be in the form of an attachment coming with or solid separately from the hand unit of the MIG welders. Such attachment is coupled to a source of oxygen and includes a manual control for the jet of oxygen used to oxidize and thereby cut the metal. To initiate the cutting action, an electric arc is first established for a short time to sufficiently locally heat the metal so that rapid oxidation will proceed without any further outside source of energy. Thereafter, the oxygen jet directed at the heated metal is turned on and the electric arc turned off or extinguished, with cutting then proceeding at a rapid rate using only the oxygen jet to both oxidize the metal as a source of heat and blow away molten metal to provide a clean, readily controllable cut without excessive heating of the adjacent material, minimizing the untempering of heat treated materials, and in the case of thin material, without warping the same.

10 Claims, 4 Drawing Sheets

Fig. 3

CUTTING TOOLS FOR CONVENTIONAL AND MIG ELECTRIC WELDERS

BACKGROUND OF THE INVENTION

1. Field of the Invention

The present invention relates to the field of welding, and more particularly to the cutting of various materials with welding equipment and attachments thereto.

2. Prior Art

Welders of various kinds are well known in the prior art. Of particular importance to the present invention are electric welders. In conventional electric welders, sometimes referred to as stick welders, welding progresses through the establishment of an electric arc between the end of a welding rod and the work piece or work pieces. Such welding rods are often provided with a suitable flux or flux generating material covering the metal rod, which material prevents the oxidation of the welding rod material and the adjoining areas to the work piece during the welding process. This type of welding equipment is well known and is relatively inexpensive. It also has the advantage that for small welding jobs, the operator can very easily change welding rods as to size so as to be able to weld thin material one minute and thick material the next, and to change rods as to material as appropriate for welding different materials. Such welders have the disadvantage, however, that for large welding jobs, the cost of the required welding rods is relatively high, and the welding process must be interrupted periodically for the replacement of the welding rod.

In recent years metal-inert gas (MIG) welders have gained in popularity and are now commercially available at reasonable prices. These welders are also electric arc welders, though include a hollow cable and special hand unit through which an inert-gas, such as carbon dioxide, is fed to protect the welding wire and weld area from oxidation. This allows the use of a bare wire as a welding rod, which is provided in coil form and fed through the hollow cable and special hand unit at an appropriate controllable rate to feed additional welding rod or wire as it is deposited in the welding process. Alternatively, in these welders a tungsten electrode may be used in place of the wire welding rod for the melting and/or fusing of the work piece or work pieces as desired.

Electric arc welders can be used for cutting also, typically by replacement of the metal rod by a graphite member and striking an arc with a work piece to gouge out the metal at the cut line. Because the cutting is by way of merely heating the metal to the melting temperature and allowing the metal to flow off the work piece, and because the resulting cut can only proceed at a limited rate, the resulting cut may be relatively jagged rather than clean, the process causes substantial heating in the adjacent work pieces, and frequently results in balls of melted and resolidified metal adhering to the region of the cut or adjacent regions of the work piece. In the case of thin metal, the heating of the adjacent work pieces may result in local yielding of the material from the stresses due to the thermal expansion thereof, resulting in a warping and untempering of the material when the work piece or pieces cool after cutting.

In the case of oxyacetylene torches, welding is accomplished by heating the metal to the melting point in a flame resulting from the burning of a mixture of acetylene and oxygen, the acetylene and oxygen being provided to the flame from separate containers therefor through separate orifices in the welding hand unit. For purposes of cutting, a cutting torch is used which establishes an initial flame much like an oxyacetylene torch for welding, though further includes a hand operated valve to direct jets of extra oxygen to the cutting region to assist in blowing the molten metal away from the cut. While such cuts are cleaner than result from the use of an electric welder, oxyacetylene cutting torches still provide a relatively rough cut, result in substantial heating of the work pieces, untempering of heat treated steel, and warping of thin material, and also may result in the solidification and/or fusing of molten metal in undesired locations.

In U.S. Pat. No. 866,498, a method of melting through masses of material is disclosed. In accordance with that patent, a hole may be made in steel plate such as armorplate by connecting, as asserted in that patent, "one pole of a circuit supplying electric current to the armor-plate, and the other pole is connected with an electrically conducting pipe through which oxygen is blown. Now if the armor-plate is contacted by the pipe and if oxygen is simultaneously blown through said pipe, only a flash of the short-circuit spark takes place, but the heat suffices for commencing the fusing and the oxygen perforates the plate in a fraction of a minute. It is here not a question of electric melting, or of a supply of oxygen to the electric arc; the action of the heating by the heat generated electrically and the melting through by means of the current of oxygen take place in point of time one after the other, as the current of oxygen indeed blows out the electric arc, or does not even allow it to form at all". (See also U.S. Pat. No. 999,099 for a related disclosure).

It would seem that the use of a pipe in the manner described could be satisfactory for effectively punching holes in plate as described, but that the same would not be very satisfactory for cutting plate and the like, as the unconfined oxygen emitted from the pipe would not give the desired oxygen jet characteristic. On the other hand, if a finer tubing was used, the desired oxygen jet characteristics might be achieved, though repeated arcing to initiate cutting would erode and perhaps deform the tubing exit, resulting in different and perhaps deteriorating cutting characteristics of the device over a period of time.

In U.S. Pat. No. 1,709,886, a cutting torch is disclosed wherein when the metal is heated to the proper temperature, a valve mechanism is operated to gradually cut off the supply of acetylene or fuel gas to the central or cutting orifice, after which the supply of oxygen to the cutting orifice is increased. The hand unit for this purpose is provided with four flow control valves rather than two as commonly found in normal oxyacetylene cutting torches. This valve mechanism is so constructed and arranged that a standard torch tip may be used with the cutting torch. However, while this feature would allow one having the special hand unit to have better access to tips of various sizes etc., the special hand unit required would make the cutting torch of Smith more expensive than a conventional oxyacetylene torch and thus subject to natural market resistance. In that regard, it is noted that while the cutting torch of Smith potentially could work very well, it is unclear what the commercial success of such torches might have been, though their apparent absence in the current market place at least indicates that for various reasons, they did not enjoy the long lasting success enjoyed by such other related technologies as electric arc welding in general, and conventional oxyacetylene cutting torches wherein a significant oxyacetylene flame is maintained even during cutting.

Other patents of interest include U.S. Pat. Nos. 894,195, 1,106,724, 1,247,791, 1,609,859, 1,494,003 and 2,524,223.

BRIEF SUMMARY OF THE INVENTION

Cutting tools for MIG (metal-inert gas) welders and conventional electric arc welders which provide clean and fast cutting action of ferrous and other oxidizeable materials using only a directed stream of oxygen after cutting is initiated are disclosed. For MIG welders, the cutting tool may be in the form of an attachment coming with or sold separately from the hand unit of the MIG welders. Such attachment is coupled to a source of oxygen and includes a manual control for the jet of oxygen used to oxidize and thereby cut the metal. To initiate the cutting action, an electric arc is first established for a short time to sufficiently locally heat the metal so that rapid oxidation will proceed without any further outside source of energy. Thereafter, the oxygen jet directed at the heated metal is turned on and the electric arc turned off or extinguished, with cutting them proceeding at a rapid rate using only the oxygen jet to both oxidize the metal as a source of heat and blow away molten metal to provide a clean, readily controllable cut without excessive heating of the adjacent material and in the case of thin material, without warping the same. An embodiment for conventional "stick" electric welders is also disclosed.

BRIEF DESCRIPTION OF THE DRAWINGS

FIG. 11 is a side view of the hand unit with the electrode extended and the the oxygen valve on.

FIG. 12 is a view taken along line 12—12 of FIG. 11.

FIG. 13 is a partial cross section of the hand unit taken through the oxygen valve.

DETAILED DESCRIPTION OF THE INVENTION

The purpose of the present invention is to provide a cutting capability for electric welders which will provide the ability of making clean, fast, and readily controllable low temperature cuts in mild steel, of various thicknesses, by way of an attachment to or as a special hand unit for electric welders, whether conventional stick welders or MIG welders. While the attachment may be provided with or integrated into the hand unit of MIG welders and stick welders at the time of manufacture, one of the advantages of the present invention is the fact that the attachment may be sold separately, allowing people to upgrade their electric welders with this additional capability at a later time, and equally importantly, providing a large market for the attachment as an accessory for the large base of electric welders currently in use. Thus, in the disclosure to follow, the invention is disclosed and described in the context of an add-on accessory to MIG welders, and as a special hand unit for stick welders, though it will be appreciated by those skilled in the art that the same may readily be integrated into the hand unit of a MIG welder as an integral assembly as desired.

Figure 1:
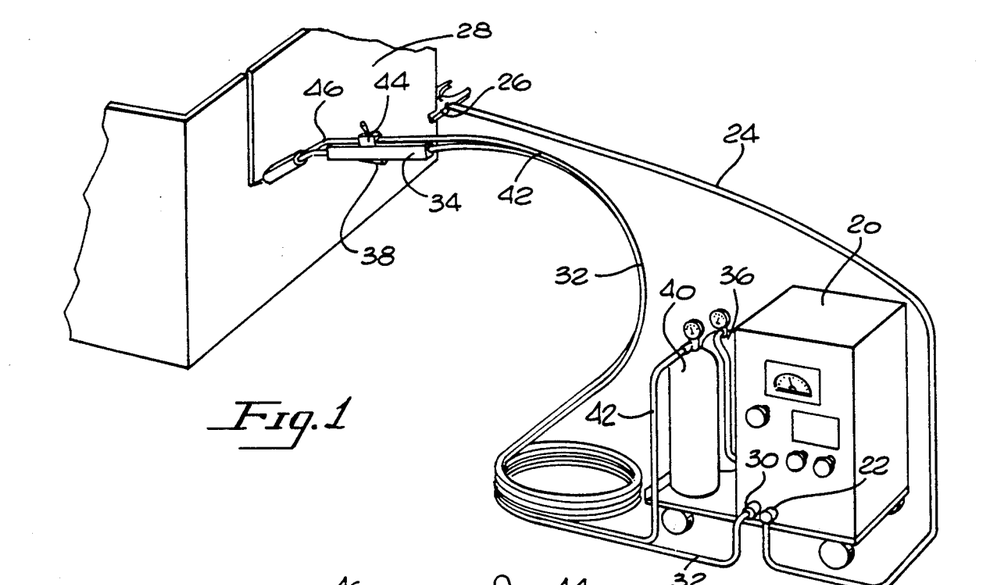
FIG. 1 is a perspective view illustrating a MIG welder with the present invention cutting assembly thereon.

Now referring to FIG. 1, a perspective view of one embodiment of the present invention used in conjunction with a MIG welder may be seen. It is to be understood that the term MIG welder is used in a most general sense for metal-inert gas electric arc welders. As shown in the figure, the console 20 containing the power supply and wire feed has a ground connection 22 coupled through line 24 to clamp 26 clamped to work piece 28. A second connection is provided through terminal 30 and line 32 to the hand unit 34. In a typical MIG welder, console 20 includes a welding wire feed drive system which, during welding, feeds the wire from a coil at a controllable rate through the center of terminal 30, through line 32 and through the hand unit or gun 34 to the tip attached thereto so that welding may proceed in a continuous manner, with the wire being automatically replenished as it is consumed during the welding. Also, a supply of inert-gas such as carbon dioxide is provided by a tank 36 thereof at a regulated pressure through the console 20 and out through line 32 around the wire therein, and is expelled around the ar to protect against oxidation in the resulting weld. Typically the wire feed is manually controllable, as is the welding power itself, by a single switch control 38 on the gun which controls both welding power and wire feed through appropriate relay control.

In accordance with the present invention, an oxygen tank 40 is also provided, with the oxygen being supplied through line 42 to a lever operated valve 44 conveniently positioned with respect to the gun 34 (see also FIGS. 2 and 3) so as to be readily operable, typically by the thumb of the operator. The valve 44 is coupled through a line 46 to an oxygen nozzle appropriately disposed to direct the stream of oxygen approximately at the normal position of the end of the welding wire. This stream of oxygen, which may be varied by changing the oxygen pressure and nozzle 56 in accordance with the thickness of the work piece being cut, is normally a relatively fine and relatively high velocity stream to direct the oxygen in a tightly controlled manner to the region of the cut. The oxygen of course causes the rapid oxidation of the already hot metal, releasing additional heat to maintain the process and at the same time blowing away the oxidized metal as well as any molten metal in the region of the cut. Since this process proceeds relatively rapidly and the width of the cut is relatively small, the heating of the adjacent work piece material is relatively low. While this is advantageous in avoiding inadvertent burns when picking up a work piece which has just been cut, etc., it also has the advantage when cutting particularly thin materials of avoiding warping adjacent to the cut due to the thermal expansion and yielding of the material during cutting, and also minimizes the undesirable untempering of thicker heat treated materials.

Figure 2:
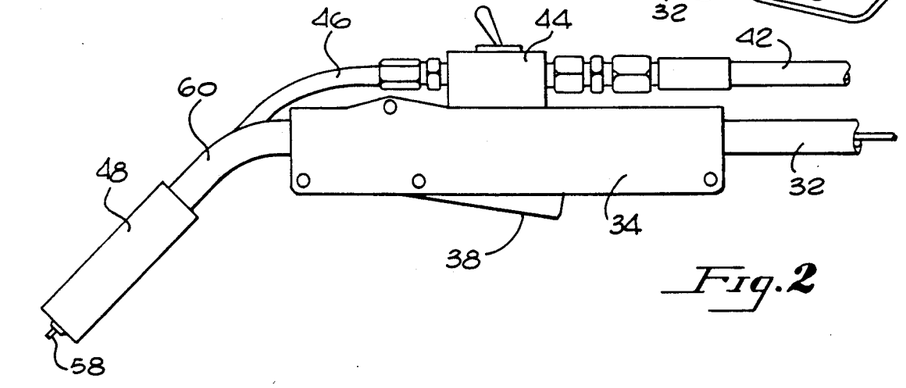
FIG. 2 is a side view of the gun of the welder of FIG. 1 illustrating the present invention thereon.
Figure 3:
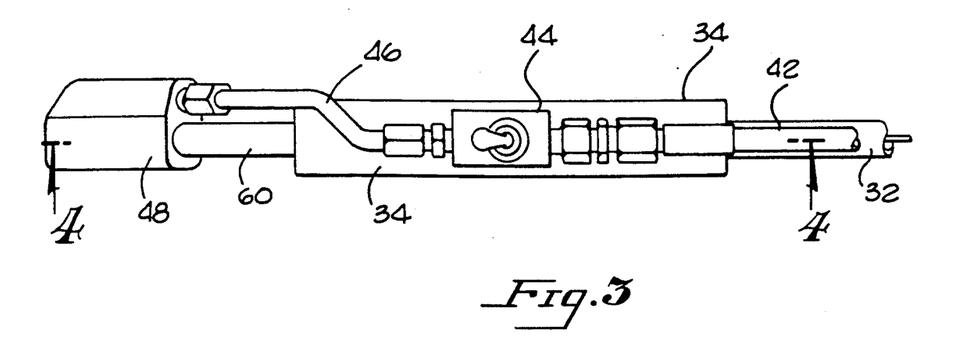
FIG. 3 is a top view of the gun shown in FIG. 2.
Figures 4, 5, 6:
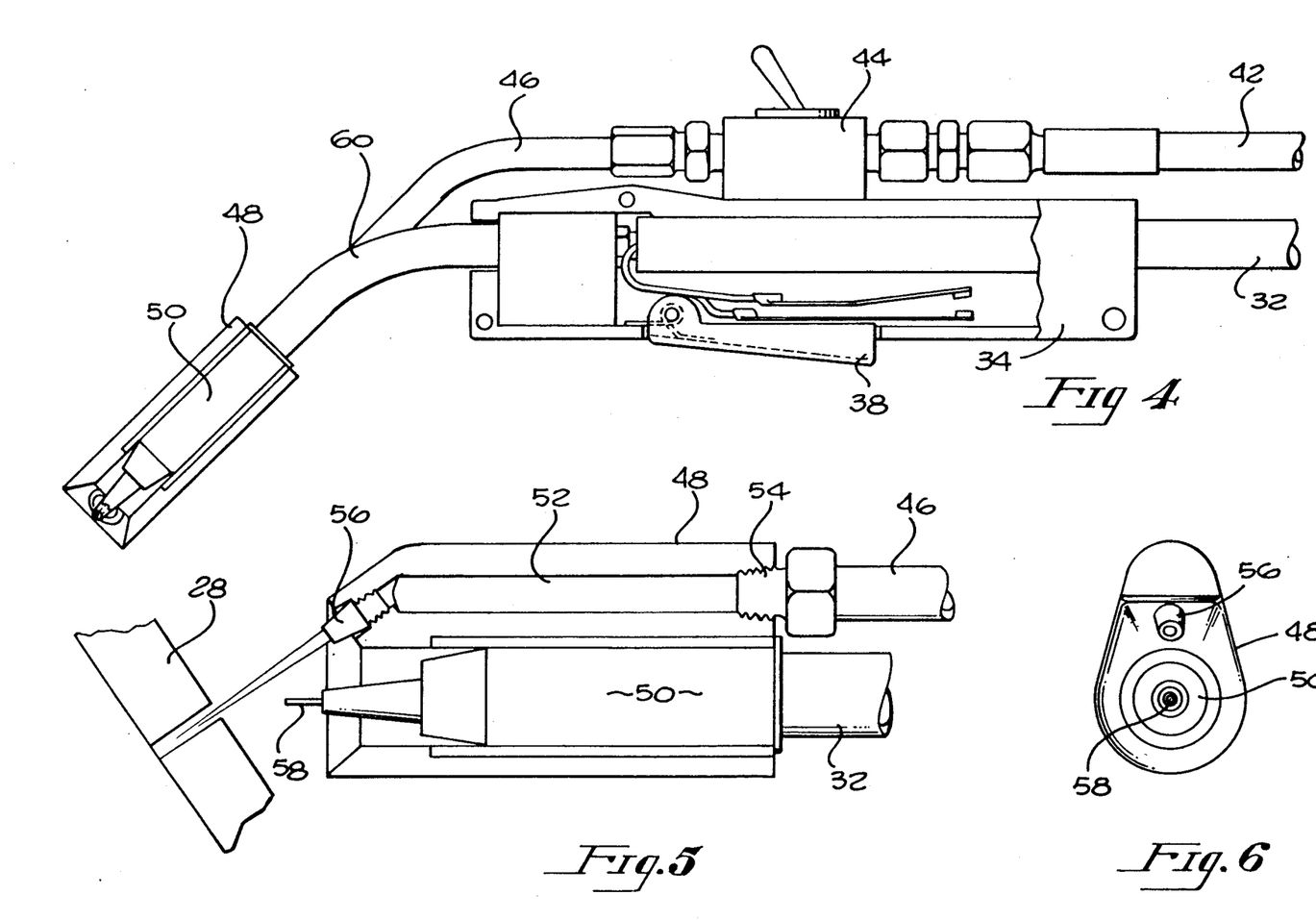
FIG. 4 is a side view of the gun of FIGS. 1 through 3 taken on an expanded scale and showing greater detail with respect to the gun and attachment thereto.
FIG. 5 is a partial cross section taken through body 48 of the cutting attachment, illustrating the general orientation and arrangement of the oxygen jet.
FIG. 6 is a left end view of the assembly illustrated in FIG. 5.

Further details of the attachment shown in FIGS. 1 through 3 may be seen in FIGS. 4 through 6. Line 42, the flexible oxygen supply line, is coupled to oxygen valve 44 which is in turn connected through a formed rigid line 46 (see also FIG. 3) to a body member 48 which slides over nozzle cup 50 of the conventional MIG gun 34. While valve 44 and/or the lines connected thereto could be fastened directly to the gun 34, it has been found that a good fit of body 48 on nozzle cup 50 of the gun, together with a properly formed rigid line 46 and sufficiently flexible line 42, result in maintaining the attachment on the gun in a desired manner without any such permanent attachment. In that regard, an operator would normally have his hand around not only the hand unit 34, but also the couplings coupling line 42 to the valve to retain the attachment in a fixed relative position with respect to the gun. Obviously of course, if desired, the valve 44 or other parts of the assembly may be attached to the hand unit 34 by screws, tape, or other means as desired. Further, line 42 as shown in FIG. 1 is directly following the MIG welder line 32, as if the two lines are taped together at various positions or so held by other appropriate means such as plastic wire ties and the like. Obviously as may be seen in FIG. 4, taping line 42 to line 32 adjacent hand unit 34 would similarly more permanently fasten the attachment to the gun 34 for more prolonged use thereof, or alternatively, the welding line and oxygen line may be totally independent to facilitate removal of the attachment when not used.

The structure of body 48 may be best seen in FIGS. 5 and 6. Aside from the opening therein for sliding onto the nozzle cup 50 of the gun, body 48 has a passage 52 therein threaded at one end to receive a fitting 54 to which line 46 is attached. At the other end of the passage 52 is a port drilled at an angle to receive the oxygen nozzle 56 so as to direct the oxygen flowing therethrough in a path intersecting the center line of the normal welding wire 58. Thus, by closing switch 38 (see also FIG. 4) power is supplied to the welding wire as well as the wire advance system, enabling the striking of the arc followed of course by turning on the oxygen, and turning off switch 38 to terminate power to the welding wire and the advance mechanism therefor as cutting proceeds.

The nozzle 56, being threaded into body 48, is readily changeable so that the nozzle size may be varied as desired to accommodate different thicknesses of material being cut. In that regard, while one can vary the tip size and oxygen pressure in accordance with one's own preference, the following sizes and pressures have been found suitable for the applicable steel thicknesses.

| Steel | Tip | O$_2$ Pressure |
| --- | --- | --- |
| 10–12 g | 5/64" | 30 lb |
| 3/16" | 5/64" | 30 lb |

-continued

| Steel | Tip | O$_2$ Pressure |
| --- | --- | --- |
| ¼" | 5/64" | 40 lb |
| ⅜" | 5/64" | 45 lb |
| ½" | 3/32" | 40 lb |
| ¾" | 3/32" | 45 lb |
| 1" | 3/32" | 50 lb |

Also, it will be noticed in the figures such as FIGS. 4 and 5 that the oxygen jet is essentially directed from the side with respect to the center line plane of the gun 34. However, for square edge cuts, one can easily hold the gun at a position which will allow the jet to impinge perpendicular to the work piece in a manner providing good visibility of the work piece by the operator.

If desired of course, the oxygen jet could easily be reoriented such as to impinge from below in the plane of the gun 34 in a direction substantially parallel to the longitudinal axis of the gun, or for that matter, at any other desired angle. Further, if desired, one could use some form of swivel or flexible line 46 to allow an operator to rotate the attachment as desired. In that regard, it should be noted that conductor tubes such as conductor tube 60 which determines the angle of the nozzle cup 50 with respect to the gun 34 are available with various angles of bend therein, and accordingly the orientation of the nozzle cup 50 of the MIG welder hand unit as well as the orientation of the oxygen jet can be varied as desired. Obviously, also as previously mentioned, the means for providing the oxygen jet could be built into the hand unit and snout in any of various ways, though it is believed preferable to have the oxygen jet to the side of the snout and angled so as to pass through the center line of the welding wire being emitted, as such an arrangement allows one to make a square cut while holding the gun at an angle convenient both for initially striking the arc and for appropriately controlling the cut.

Figure 7:
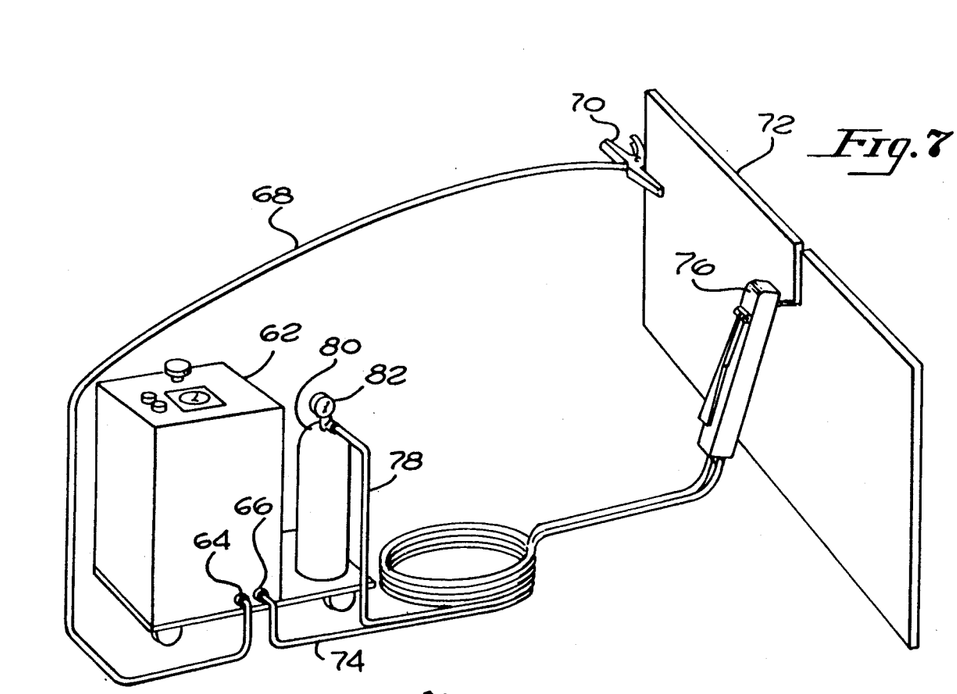
FIG. 7 is a perspective view of a stick welder power supply with an alternate hand unit of the present invention cutting device coupled thereto.

Now referring to FIG. 7, a perspective view similar to FIG. 1 showing the present invention as attached to an ordinary stick welder may be seen. Here a welding console, basically a power supply 62, has a pair of terminals 64 and 66 thereon, terminal 64 being connected through a ground line 68 to clamp 70 clamped to the work piece 72. Terminal 66 of the power supply 62 is connected through line 74 to a hand unit 76 of special design. Also connected to the hand unit 76 through an appropriate hose 78 is an oxygen bottle 80 for providing oxygen to the hand unit at an appropriate pressure, controllable through regulator 82 on the oxygen bottle as required.

Figure 8:
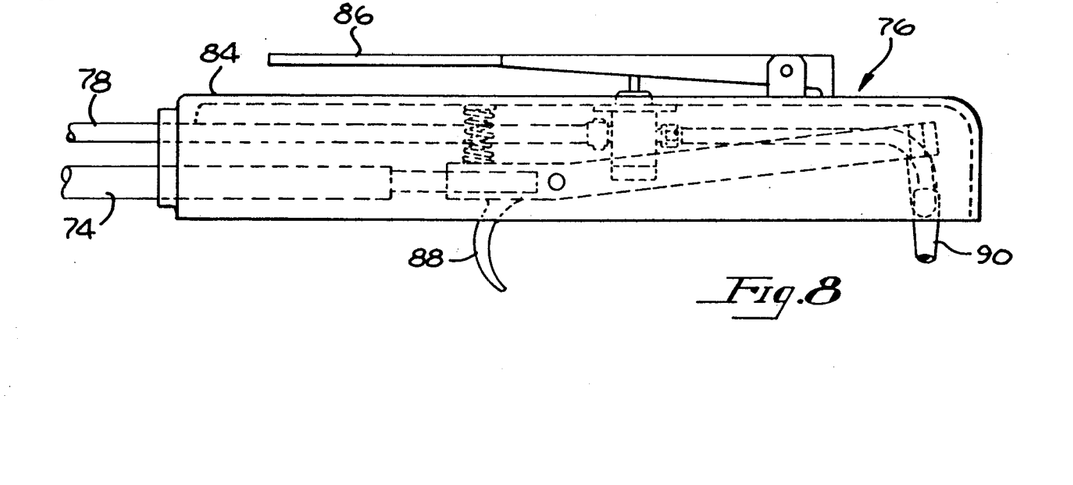
FIG. 8 is a side view of the hand unit shown in FIG. 7.
Figure 9:
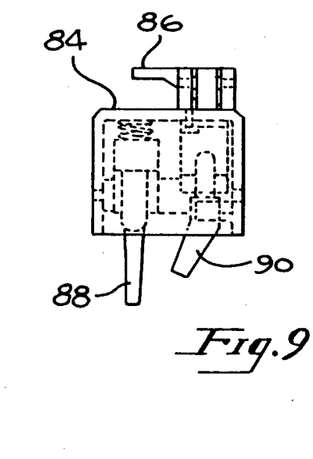
FIG. 9 is an end view of the hand unit of FIGS. 7 and 8.
Figure 10:
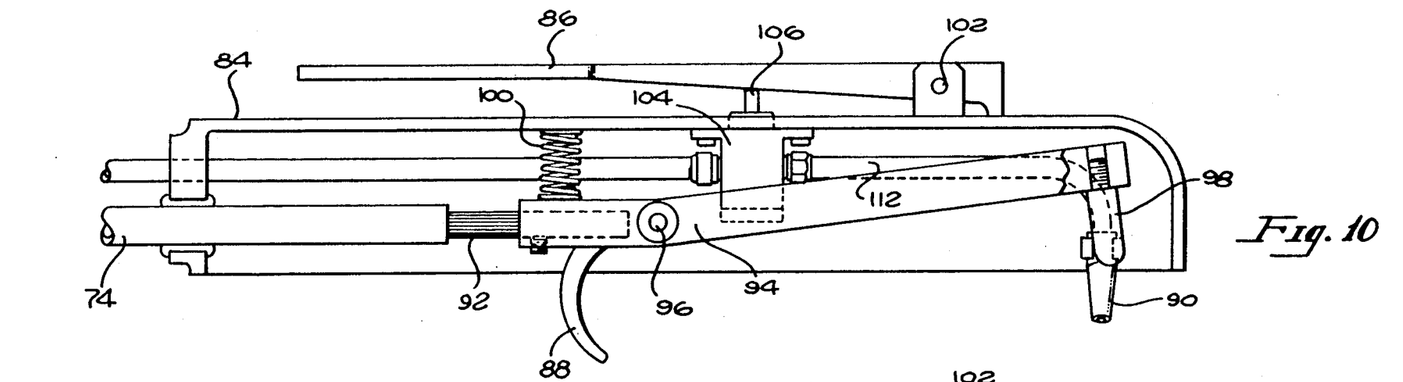
FIG. 10 is a side view of the hand unit, partially cut away to show the details of the internal structure thereof.

The hand unit itself may be best seen in FIGS. 8, 9 and 10, of which FIG. 8 is a side view showing various internal parts thereof in phantom, FIG. 9 is an end view similarly showing various internal parts in phantom, and FIG. 10 is a partial cross-section taken on an expanded scale showing more of the detail thereof. The hand unit is comprised of a body member 84 having a hand actuatable lever 86 at the top thereof, and a trigger-like finger pull 88 therebelow. Coming into the hand unit 76 at one end thereof are the electric cable 74 and an oxygen line 78, with an oxygen nozzle 90 projecting downward at an angle (see FIG. 9) adjacent the opposite end of the hand unit.

Referring now more specifically to FIG. 10, the internal parts of the hand unit may be seen. The conductor 92 of cable 74 is electrically connected to one end of member 94, substantially in line with the pivot support 96. Also supported by member 94 is the trigger 88 which may be integral therewith, though preferably plastic coated so as to be electrically insulated therefrom, or alternatively, the trigger 88 may be a plastic trigger or a metal trigger electrically insulated from member 94. In any event, at the outer end of member 94 is a nose piece electrode 98 threaded thereinto so as to be replaceable as desired. Member 94 is yieldably encouraged to the position shown by a compression spring 100 disposed between one end of member 94 and the body 84 of the hand unit. By pulling the trigger 88, member 94 will rotate as shown in FIG. 11, thrusting nose piece 98 downward as shown in that figure to be adjacent to the oxygen nozzle 90 therebeside, the nose piece 98 of course remaining in electrical connection to cable 74 and thus the welder power supply when so positioned.

The lever 86 at the top of the hand unit 76 is pivotly supported on pin 102 from the body 84 of the hand unit so as to be easily and readily depressed and comfortably maintained in the depressed position by pressure from the palm of the hand of an operator. Disposed under the lever 86 so as to be actuated thereby is a valve 104 having a valve actuating member 106 projecting upward to be depressed by actuation of the lever. The valve itself may be seen in FIG. 13, which is a partial cross-section taken therethrough. The valve comprises a valve body 108 having fittings 110 thereon to which tubing or hose 112 is connected to couple the same to the oxygen line 78 and the nozzle 90. Within the body 108 is a piston member 114 having o-ring 116 thereon for sliding within the cylinder formed by body member 108, the piston 114 also having a groove 118 therein below the o-ring to provide gas communication between the inlet tube and the outlet tube connected thereto. In that regard, the piston is shown in the depressed position, being pushed downward by the engagement of lever 86 with the valve actuating member 106 against the upward force provided by compression spring 120 captured between the piston 114 and lower cap 122 of the valve body. When lever 86 is allowed to move upward in response to the force provided by spring 120, the lower part of the piston, having a well lubricated slip fit within the cylinder, will seal the inlet and outlet preventing communication of the oxygen between the inlet and outlet lines.

Figures 11, 12, 13:
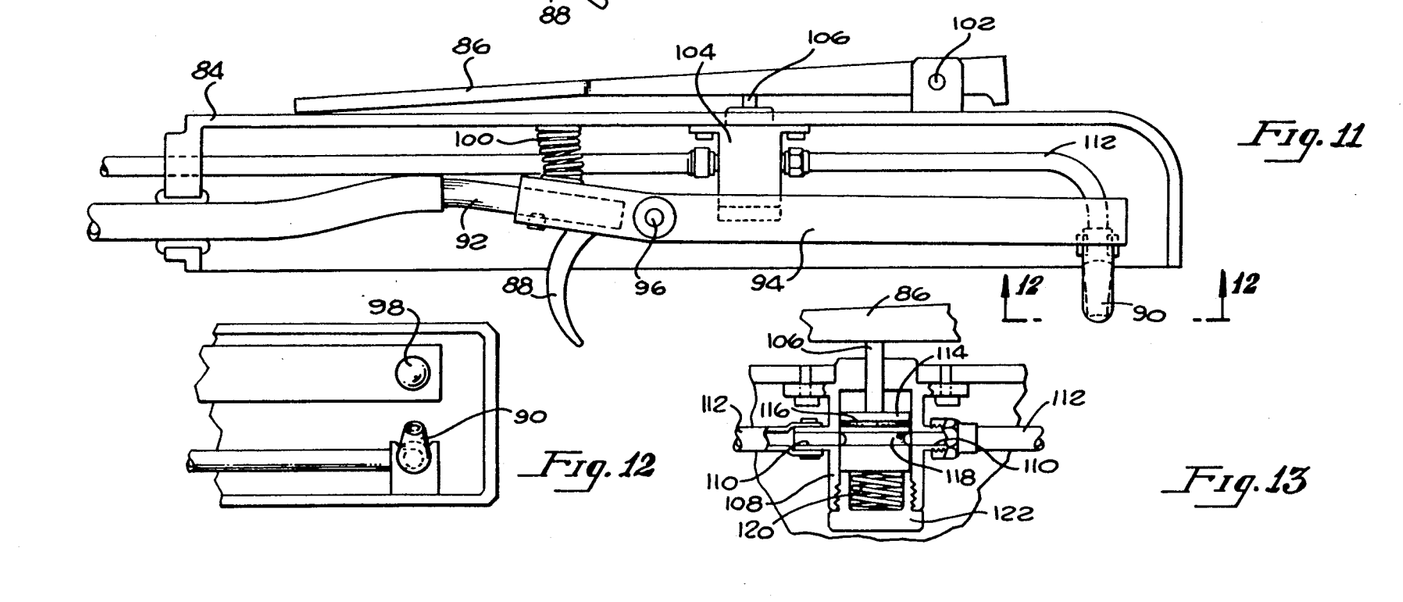

To use the device of FIGS. 7 through 13, the trigger 88 is first pulled as shown in FIG. 11. This lowers the nose piece 90 to a position enabling the operator to touch the same to the work piece to heat a local area of the same to a hot molten state. Then lever 86 is depressed to turn on the oxygen which is directed through nozzle 90 to the region of the molten metal to initiate cutting. At about the same time, trigger 88 may be released, allowing the nose piece 98 to be retracted as illustrated in FIG. 10, with cutting proceeding under the oxygen jet alone from thereon. As before the oxygen nozzle is preferably readily replaceable as a slip-in or screw in element so that the nozzle size may be changed as desired dependent upon the thickness of the material being cut.

The present invention has been described herein in the context of its most frequent application, namely, the cutting of ferrous materials such as steel plate such as hot rolled and cold rolled steel. Obviously of course, the invention may also be used to cut ferrous bars, pipe, etc., as desired. Thus while the present invention has been disclosed and described with respect to specific embodiments and uses thereof, it will be understood by those skilled in the art that various changes in form and detail may be made therein without departing from the spirit and scope of the invention.

We claim:

1. A method of cutting electrically conducting and oxidizable work pieces comprising the steps of:
   (a) connecting one terminal of an electric welder to a work piece;
   (b) connecting a second terminal of an electric welder to an electrode in a hand unit;
   (c) striking an arc between the electrode in the hand unit and the work piece to locally heat the work piece material to a readily oxidizable temperature;
   (d) terminating the arc and directing a stream of oxygen to the region of the work piece heated by the arc, the stream of oxygen being directed from an oxygen nozzle adjacent to and spaced from the electrode; and
   (e) cutting the work piece by moving said nozzle such that said stream of oxygen moves along a predetermined path on the work piece, whereby the work piece is cut by the stream of oxygen alone without said arcing electrode.

2. The method of claim 1 wherein the stream of oxygen is directed at the work piece from an oxygen nozzle adjacent to and spaced from the electrode and angled with respect thereto to direct the oxygen stream through a line substantially coaxial with the electrode.

3. The method of claim 1 wherein step (b) comprises the step of connecting a second terminal of an electric welder to a welding rod in the hand unit of the welder.

4. The method of claim 3 wherein the electric welder is a stick welder.

5. The method of claim 3 wherein the electric welder is a MIG welder.

6. A method of cutting oxidizable metal work pieces comprising the steps of:
   (a) adding an attachment to a hand unit of an electric welder, the attachment having a nozzle for directing an oxygen stream therefrom, and connecting the attachment to a source of oxygen;
   (b) connecting one terminal of an electric welder to a work piece;
   (c) connecting a second terminal of an electric welder to an electrode in the hand unit;
   (d) striking an arc between the electrode in the hand unit and the work piece to locally heat the work piece material to a readily oxidizable temperature;
   (e) terminating the arc and turning on the oxygen stream to direct a stream of oxygen at the region of the work piece heated by the arc, the stream of oxygen being directed from the oxygen nozzle adjacent to and spaced from the electrode; and
   (f) cutting the work piece by moving said nozzle such that said stream of oxygen moves along a predetermined path on the work piece, whereby the work piece is cut by the stream of oxygen alone without said arcing electrode.

7. The method of claim 6 wherein the stream of oxygen is directed at the work piece from an oxygen nozzle adjacent to and spaced from the electrode and angled with respect thereto to direct the oxygen stream through a line substantially coaxial with the electrode.

8. The method of claim 6 wherein step (b) comprises the step of connecting a second terminal of an electric welder to a welding rod in a hand unit of the welder.

9. The method of claim 8 wherein the electric welder is a MIG welder.

10. An electric welder having metal cutting capabilities comprising:
   an electric welder power supply having first and second power supply terminals;
   a clamp for electrically connecting between said first power supply terminal and a work piece;
   a hand unit for electrically connecting to said second power supply terminal, said hand unit having a nozzle for directing a stream of oxygen toward a work piece, and means including a manually operable valve for coupling said nozzle to a source of oxygen, said hand unit also having an electrode adjacent said nozzle for initially heating said work piece to initiate cutting action of an oxygen stream, said electrode being manually retractable once cutting by the oxygen stream is initiated.

* * * * *

UNITED STATES PATENT AND TRADEMARK OFFICE
CERTIFICATE OF CORRECTION

PATENT NO. : 5,021,624
DATED : 6/4/91
INVENTOR(S) : Rogers et al.

It is certified that error in the above-identified patent and that said Letters Patent is hereby corrected as shown below:

On the Title page

| | | |
|---|---|---|
| abstract [57], line 07 | delete "solid" | insert --sold-- |
| abstract [57], line 22 | after "same." | insert --An embodiment for conventional "stick" electric welders is also disclosed.-- |
| col. 04, line 47 | delete "ar" | insert --arc-- |

Signed and Sealed this

Twenty-sixth Day of January, 1993

Attest:

STEPHEN G. KUNIN

*Attesting Officer*     *Acting Commissioner of Patents and Trademarks*